Feb. 21, 1950     C. A. YOUNG     2,498,021
METHOD AND APPARATUS FOR ASSEMBLING BATTERY ELEMENTS
Filed Dec. 20, 1946     2 Sheets-Sheet 2

INVENTOR.
CHARLES A. YOUNG
BY
Kwis, Hudson, Boughton & Williams
ATTORNEYS

Patented Feb. 21, 1950

2,498,021

UNITED STATES PATENT OFFICE 2,498,021

METHOD AND APPARATUS FOR ASSEMBLING BATTERY ELEMENTS

Charles A. Young, Cleveland Heights, Ohio, assignor to Willard Storage Battery Company, Cleveland, Ohio, a corporation of West Virginia Application December 20, 1946, Serial No. 717,484

10 Claims. (Cl. 29—286)

1

This invention relates to a method and apparatus for assembling positive and negative battery plates and separators into cell elements for storage batteries.

In manufacturing lead acid storage batteries, it is customary to assemble the positive plates in spaced relationship and burn their edges to a common strap, assemble the negative plates in spaced relationship and burn their edges to a common strap, dovetail the two assemblies together, and then insert the separators between the positive and negative plates thus forming a cell element. Such a procedure is not satisfactory in many instances and is especially undesirable where the separators are formed of a material such as glass wool or the like, which does not have sufficient rigidity to permit them to be pushed between the plates, or where the battery plates are closely adjacent each other so that the separators must actually contact the plates. In prior attempts to assemble the plates and separators by alternately laying one upon the other difficulties were encountered in laterally centering the plates relative to the separators due to the fact that the latter have a slightly greater width than the plates.

An object of this invention is the provision of a method and apparatus for assembling battery plates and separators sequentially in their proper order and with the battery plates properly centered relative to the separators.

Another object of the invention is to provide an improved apparatus for assembling battery plates and separators in a more rapid and efficient manner with the battery plates centered relative to the separators, the apparatus being so constructed and arranged that the means for effecting the centering may be operated by a treadle thus leaving the operator's hands free to handle the plates and separators.

A further object of the invention is to provide an improved method for manually assembling battery plates and separators with the battery plates centered relative to the separators, the method being characterized by a sequence of operator manipulations, simple in nature, rapidly effected, and requiring no particular skill on the part of the operator.

Other and further objects of the invention reside in various details of construction, combinations and arrangements of parts of the apparatus and of procedural steps as will hereinafter become more clearly apparent from the following detailed description of the present preferred embodiment of the invention, described with reference to the accompanying drawings in which.

Figure 1:
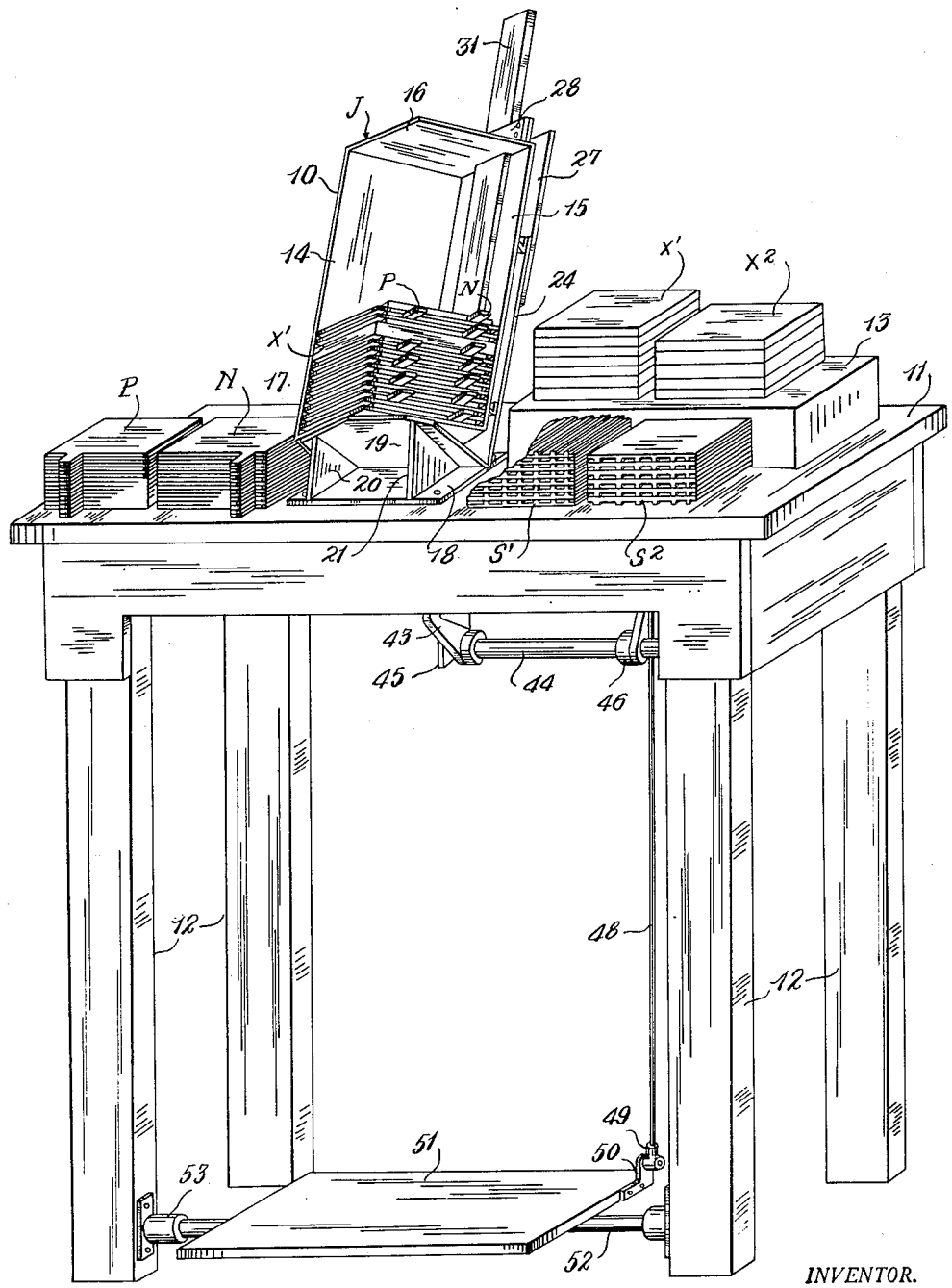
Fig. 1 is a perspective view of the improved apparatus constructed in accordance with this invention for assembling storage battery plates and separators and also illustrating the positions of the various plates and separators for effecting the method of the invention, a portion of one pile of separators being broken away to more clearly illustrate the apparatus.

Referring first to Fig. 1 of the drawings, there is illustrated an apparatus constructed in accordance with this invention for assembling battery plates and separators into cell elements, and also the arrangement, relative to the holder of the assembling apparatus, of the piles of battery plates, separators and other elements necessary for assembling the battery cell elements. The assembling apparatus, generally designated 10, may comprise a suitable support, such as a bench or table, having a top 11 mounted upon legs or other supporting means 12. Preferably, the holder or container J of the battery assembling apparatus is located substantially in the forward central portion of the table or bench top 11 and the battery plates, separators and spacing blocks are arranged thereabout in convenient piles in a manner similar to that shown in Fig. 1.

In arranging the elements to be assembled, the negative plates N are stacked in a single pile with their terminal connecting lugs all directed the same way, the said pile of negative plates N being preferably placed closely adjacent the left side of the holder or container J with the terminal lugs directed forwardly adjacent the right side of the pile. To the left of the pile of negative plates N is arranged a pile of positive plates P also having their terminal lugs in alignment and directed forwardly adjacent the left side of the pile. To the right of the holder of the assembling apparatus is a stack of plate separators $S_1$ of the type to be employed in the constructed battery. These separators generally have their opposite faces formed differently, as for example, one face may be planar and the other face grooved, serrated or otherwise provided with projections for reasons well understood in the art. Hence, the separators should be arranged in the pile $S_1$ with the planar faces downward. Adjacent the pile of separators $S_1$, and preferably to the right thereof, is arranged a second pile of separators which are here shown as identical in nature with the separators constituting the pile $S_1$, but the separators in pile $S_2$ are arranged in reverse order; that is to say, their planar sides are uppermost. Behind the piles $S_1$ and $S_2$ are arranged two piles of blocks or spacers $X_1$ and $X_2$, the spacers in the pile $X_1$ preferably being of one thickness while the spacers in the pile $X_2$ are of a different thickness for a purpose which will hereinafter be described. To enable the operator to more readily reach the spacer blocks in the piles $X_1$ and $X_2$ they are preferably elevated above the top of the table or bench, as by placing them upon a support 13.

The holder or container J of the battery assembling apparatus 10 is preferably formed by side walls or members 14 and 15 joined together along one edge thereof and united with top and bottom portions 16 and 17, respectively, the side walls extending substantially at right angles to each other and to the top and bottom. The holder, therefore, is substantially trough-shaped and is adapted to be positioned in a device known as a burning box (not shown), the holder J cooperating with the burning box in retaining the plates and separators in proper relationship to facilitate the uniting of connecting straps with the lugs of the battery plates. This holder J is preferably removably mounted in an inclined position with its opening directed towards the front of the bench or table substantially as shown in Fig. 1. To so support the holder J in this position, the top 11 of the table or bench may be provided with a suitable mounting plate 18, upon which a polygonally-shaped plate 19 may be mounted at an angle for supporting the bottom 17 of the holder, the plate 19 being maintained at the angle desired by triangularly-shaped supports 20 and 21 which may be attached by suitable means to the plates 18 and 19. This angle, at which the holder or container J is supported, is such that the battery plates and separators may be easily inserted therein, the angle between the bottom 17 of the holder J and the top 11 of the supporting table not exceeding the angle of repose for the plates and separators. The rear of the holder or container J is supported at the desired angle by bracket members 22 and 23 against which the side wall 15 of the holder may rest, these brackets being connected with a back support plate 24 which may be formed integrally with, or connected to, the base plate 19 to extend therefrom at substantially a right angle.

The rear supporting plate 24 is in turn supported by triangularly shaped plates or brackets 25 and 26 which are connected with the lower mounting plate 18. An extension plate 27 is adjustably connected with the upper portion of the plate 24, as by means of vertical slots 27a in one of the plates and bolts 27b carried by the other of the plates, to enable holders J of various sizes to be employed. Extending angularly from the upper end of the rear support 27 is a bracket arm 28 which is adapted to extend across the top 16 of the holder J adjacent the point where the top unites with the side wall 15.

The inner surface of the side wall 15 of the holder J is provided with a longitudinally directed guide means which is here illustrated as a rectangular groove or recess 29 communicating with a rectangular slot 30 in the top 16 of the holder. The upper end of the side wall 15 has an opening 29a therethrough communicating with the grooved recess 29 and having a width less than the width of the recess. Slidably disposed within the grooved recess 29 is a longitudinally movable member which is preferably a sliding plate or bar 31, the rear face of which is provided with serrations or ratchet teeth 32. These teeth 32 may be directly formed upon the plate or bar 31 or upon a separate member attached thereto. The plate or bar 31 is adapted to extend within the groove 29 and through the top of the holder and be guided by the latter and by the bracket 28 for movement in parallel relationship with respect to the side wall 15 of the holder.

Figures 2, 3, 4, 5:
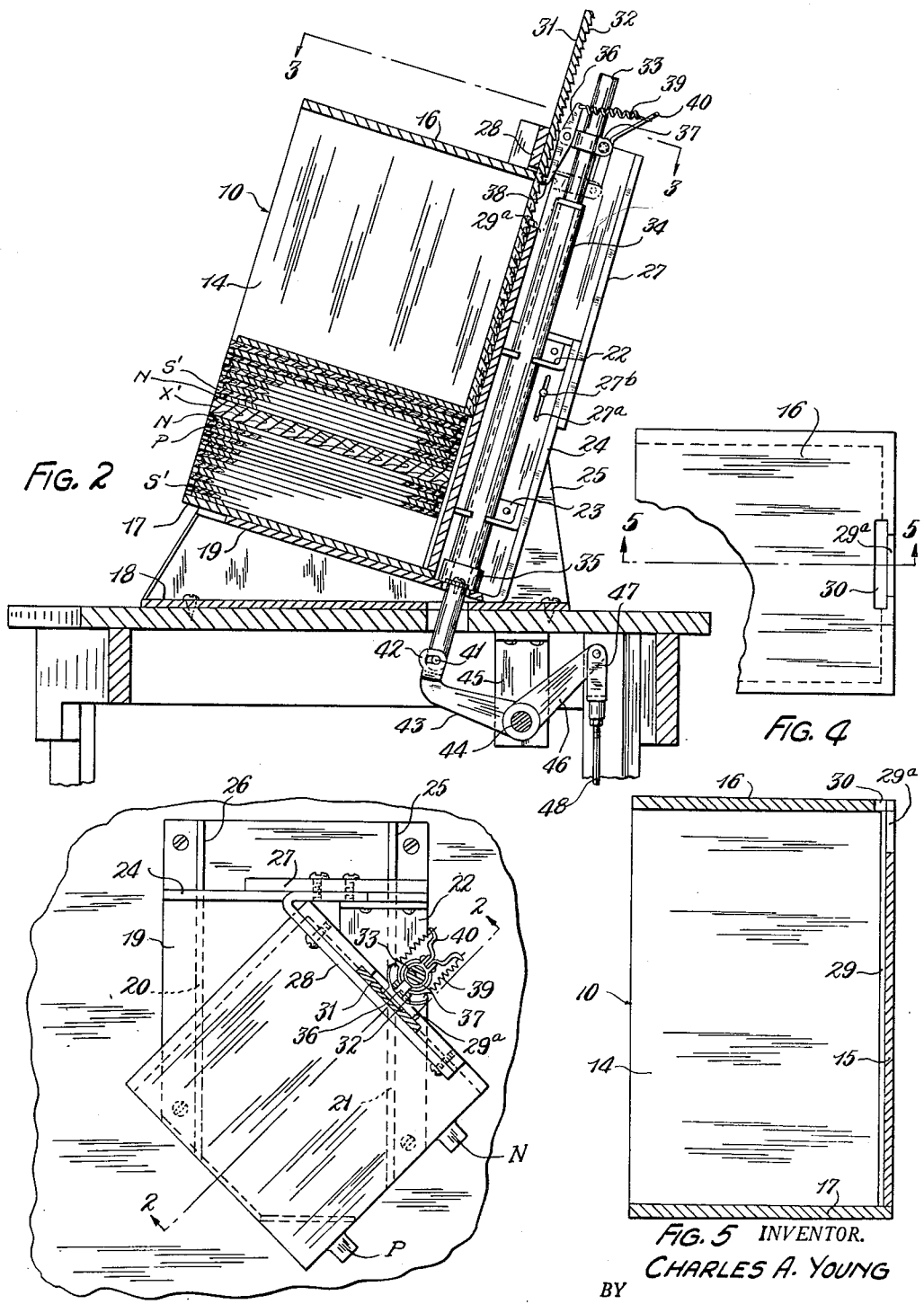
Fig. 2 is a sectional view through a portion of the improved battery assembly apparatus, the view being taken substantially along the line 2—2 of Fig. 3.
Fig. 3 is a sectional view taken substantially on the line 3—3 of Fig. 2.
Fig. 4 is a fragmentary elevational view of the top of the holder or container of the improved apparatus.
Fig. 5 is a sectional view through the holder or container of the improved assembly apparatus taken substantially on the line 5—5 of Fig. 4 and looking in the direction indicated by the arrows.

To effect movement of the bar 31, a rod 33 is slidably mounted within a tubular member or sleeve 34, extending parallel with respect to the rear supporting plates 24 and 27, and held in fixed relationship with respect thereto by brackets 22 and 23 which are suitably apertured to receive the said sleeve. The lower end of the sleeve 34 is preferably connected to the bottom plate 19 of the holder support by a flanged coupling 35. The rod 33 is slidably mounted within the said tubular member or sleeve 34 and extends beyond both ends of the latter, the lower end of the rod extending through suitable openings in plates 18, 19 and the bench top 11. Adjacent its upper end, the rod 33 is provided with a pawl 36 which is pivotally supported upon a clamp 37 secured to the said rod. The lower end of the pawl 36 is provided with a notched portion 38 for engagement with the teeth 32 upon the bar 31, the pawl being urged in a direction for effecting this engagement by a pair of springs 39 connected between the other end of the pawl and angularly extending arms 40 connected with the clamp 37. The forward edge of the pawl 36, below the notched portion 38, is inclined. Hence, when the pawl is lowered, to the position illustrated in Fig. 2, the lower edge of the opening 29a in the wall 15 cooperates with the inclined surface of the pawl to force the latter out of engagement with the teeth 32 on the bar. The bar is then free to drop under its own weight.

The lower end of the rod 33 is provided with one or more projections 41 which may be formed by a pin extending diametrically through the rod 33. These projections are received in slotted openings provided in the bifurcated outer end 42 of an arm 43 which is mounted upon a shaft 44 to rock therewith. The shaft 44 may be journaled below, and parallel with, the top 11 of the workbench or table by suitably spaced downwardly extending brackets 45. Also attached to the shaft 44 to rock therewith is an arm 46 extending in angular relationship to the arm 43 so as to, in effect, form a bell crank lever therewith. The outer end of the arm 46 is pivoted to a forked member 47 which is connected with the upper end of a rod 48, the lower end of which is provided with a fitting 49 pivotally connected to a bracket 50 which in turn is mounted upon the side of the treadle 51 adjacent the rear corner thereof. The treadle 51 is rockably supported substantially medially thereof upon a fixed rod or shaft 52 which is mounted adjacent the lower ends of the forward legs 12 of the bench by means of flanged couplings 53.

The operation of the apparatus can be best understood from a description of the mode of effecting the method of this invention. With the battery assembling apparatus set up and positioned as illustrated in Fig. 1, and with the various battery elements arranged in the piles P, N, $S_1$, $S_2$, $X_1$, $X_2$, the operator will take a position seated in front of the workbench with her feet positioned upon the treadle 51. The operator will then substantially simultaneously grasp the top plate on the pile N and the top separator on the pile $S_1$ and will insert the plates into the holder or box J slightly before inserting the separator which is to be positioned upon the battery plate. As the plate from the pile N is inserted within the holder, the treadle will be held tilted forwardly as viewed in Fig. 1, thereby maintaining the rod 33 and the pawl 36 in their lowermost positions, as indicated in broken lines in Fig. 2, it being observed that the pawl is now out of engagement with the ratchet teeth 32 so that the plate or bar 31 may drop of its own weight to the bottom of the holder. Hence, as the battery plate is inserted within the holder, one edge of the battery plate will be maintained in spaced relationship with respect to the wall 15 of the holder by engaging the outer face of the bar 31 which extends beyond the face of the side wall 15 a distance substantially equal to one-half the difference between the widths of the battery plates and the separators. As the operator is about to place the separator from the pile $S_1$ upon the battery plate, she rocks the treadle 51 in a reverse direction. This causes the rod 48 to rock the arms 46 and 43, elevating the shaft 33. As the shaft is elevated, the springs 39 will pull the notched end 38 of the pawl 36 into engagement with the teeth 32 and the continued elevation of the rod 33 as the treadle is rocked will cause the bar 31 to be raised. Hence, the separator from the pile $S_1$ may be placed in the holder with its right-hand edge in engagement with the wall 15 of the holder J and will, therefore, have this edge offset relative to the corresponding edge of the battery plate previously placed.

The operator now rocks the treadle 51 in the opposite direction as her left and right hands, respectively, are moved to engage the top positive battery plate on the pile P and the top separator on the pile $S_2$. As the treadle 51 rocks back to its initial position, the rod 33 will again be lowered, thus moving the pawl 36 downward until the notched end 38 thereof is removed from engagement with the teeth 32 on the bar 31 by the engagement of the said notched end 38 with the lower edge of the opening 29a in the wall 15 of the jig. The bar 31, being thus freed from the pawl, drops under its own weight and engages the upper surface of the separator which was previously positioned within the holder. Immediately thereafter, the operator inserts the top positive plate from the pile P into the holder J until the right-hand edge of the plate engages the bar 31. The operator then rocks the treadle 51 in a reverse direction elevating the bar 31 just prior to insertion of the top separator from the pile $S_2$. Hence, this separator does not engage the bar 31 but engages the wall 15 of the holder in the same manner as the previously inserted separator from the pile $S_1$. The bottoms of all the plates and separators, however, always engage the side 14 of the holder. These operations are then repeated by the operator again inserting the top battery plate from the pile N and the top separator from the pile $S_1$, and rocking the treadle each time that a separator is inserted into the holder to remove the bar from the path of the separator during its insertion and to immediately thereafter drop the bar into the path of the following battery plate. Thus, the desired number of plates and separators for a single cell element of a battery may be quickly and efficiently assembled with the plates laterally centered relative to the separators, the plates and separators being retained in their relative positions by the friction therebetween. As the assemblage of each cell element is completed, the operator inserts a spacing block from the pile $X_1$ instead of a separator from the pile $S_1$ into the holder following the insertion of the last negative plate, the said spacing block being inserted with the bar 31 elevated in the same manner as though a plate separator were being inserted so that the operator's rhythm in rocking the treadle is not interrupted.

The cycle is again repeated employing first a negative plate from the pile N, then a separator from the pile $S_1$, next a positive plate from the pile P, and then a separator from the pile $S_2$ until the next cell element is completed by a negative plate and another spacer from the pile $X_1$. Battery cell elements may thus be successively assembled until a desired number have been formed or the holder is substantially full, after which spacing blocks, preferably from the pile $X_2$, are inserted to completely fill the holder J. The treadle 51 may then be operated sufficiently to completely remove the bar 31 from the holder or container and the latter can then be removed from the stand and replaced with an empty holder or container which may be employed in the same manner for assemblage of battery plates and separators, the filled holder then being employed with a burning box to unite connecting straps to the battery plate lugs.

As noted heretofore the separators are preferably grooved or otherwise provided with alternate projections and depressions upon one face for reasons well understood in the art. Hence, the separators are preferably arranged in two piles, in one of which the grooved surfaces are uppermost and the other pile having the planar sides uppermost. This arrangement is particularly desirable because in conventional battery construction the planar side of the separator should be placed adjacent the negative plate and the grooved side adjacent the positive plate. By arranging the battery plates and separators in the order above described and illustrated in Fig. 1, it will be seen that the operator need only alternately select a battery plate from the pile N, a separator from pile $S_1$, a battery plate from pile P and a separator from the pile $S_2$ and insert them within the holder in this same order. As a result, the grooved sides of the separators will be adjacent the positive plate without the necessity of turning over every other separator, as would be the case if the separators were arranged in a single pile with their grooved surfaces all directed in the same way.

While the battery plates, separators and spacing blocks have been illustrated and described as being arranged in a particular order about the holder of the battery assembling apparatus, it will be apparent that the method is not changed if the order of arrangement of the battery plates, separators, etc., be interchanged; that is to say, the battery plates could be placed upon the right of the holder J and the separators and/or spacers placed to the left of the holder. Other variations in the procedural steps will be apparent to one skilled in the art. Also, while a preferred form of the apparatus employed in assembling the battery plates and separators has been illustrated in considerable detail, it will be appreciated that numerous changes and modifications may be made therein by one skilled in the art. Therefore, the invention is not limited to the preferred embodiments of the method and apparatus disclosed but only as required by the spirit and scope of the appended claims.

Having thus described my invention, I claim:

1. The method of assembling storage battery elements which comprises: providing a normally stationary holder having a base and a pair of side members united together, the side members extending at substantially right angles to each other and to the base; inserting a movable member into the holder adjacent one side member thereof for movement longitudinally of, and substantially parallel to, the said one side member; establishing separate piles of positive battery plates, negative battery plates, and plate separators at convenient positions adjacent said holder; alternately removing the top battery plates and separators from the said piles and inserting them into said holder while correspondingly alternately moving said movable member out of the path of said separators and into the path of the battery plates as they are inserted into the holder, whereby an edge of each of the battery plates engages the movable member and the corresponding edge of each separator engages the said one side member of the holder so that the battery plates and separators will be laterally centered relative to each other.

2. The method of assembling storage battery elements which comprises: providing a normally stationary holder having a base and a pair of side members united together, the side members extending at substantially right angles to each other and to the base; inserting a movable member into the holder adjacent one side member thereof for movement longitudinally of, and substantially parallel to, the said one side member; establishing separate piles of positive battery plates, negative battery plates, and plate separators at convenient positions adjacent said holder; alternately removing the top battery plates and separators from said piles and inserting them into said holder while correspondingly alternately moving said movable member out of the path of said separators and into the path of the battery plates as they are inserted into the holder, so that a side edge of each of the battery plates engages the movable member and the corresponding side edge of each separator engages the said one side member of the holder thereby laterally centering the battery plates relative to the separators, the said plates and separators being inserted into said holder until their bottom edges engage the other side member thereof.

3. The method of assembling storage battery elements which comprises: providing a normally stationary holder having a base and a pair of side members united together, the side members extending at substantially right angles to each other and to the base; inserting a movable member into the holder adjacent one side member thereof for movement longitudinally of, and substantially parallel to, the said one side member; establishing separate piles of positive battery plates, negative battery plates, and plate separators at convenient positions adjacent said holder; removing the top plate from the pile of negative plates and inserting it into said holder until an edge thereof engages said movable member; removing the top separator from the pile thereof, inserting it into the holder and moving the movable member out of the path of the separator so that the latter is positioned in the holder with an edge thereof engaging the said one side member of the holder; causing the movable member to move into engagement with the upper surface of said separator adjacent its edge; removing the top plate from the pile of positive plates and inserting it into said holder until an edge thereof engages said movable member; removing the top separator from the pile thereof, inserting it into the holder and moving the movable member out of the path of the separator so that the latter is positioned in the holder with an edge thereof engaging the said one side member of the holder; causing the lower end of the movable member to move into engagement with the upper surface of the last-mentioned separator adjacent its edge; and repeating the steps of alternate insertion of plates and separators and movements of the movable member until a complete cell unit has been assembled with the plates laterally centered with respect to the separators.

4. The method of assembling storage batteries which comprises: providing a normally stationary holder having a base and a pair of side members united together, the side members extending at substantially right angles to each other and to the base; inserting a movable member into the holder adjacent one side member thereof for movement longitudinally of, and substantially parallel to, the said one side member; establishing separate piles of positive battery plates, negative battery plates, plate separators having their planar sides facing downward, and plate separators having their planar sides facing upwardly, at convenient positions adjacent said holder; inserting the top plate from the pile of negative plates into the holder until an edge thereof engages the movable member; inserting the top separator from the pile of separators, which are piled with their planar sides downward, into the holder and moving the movable member out of the path of the separator so that the latter is positioned in the holder with an edge thereof engaging the said side member of the holder and with its planar side resting on the negative plate; causing the movable member to move into engagement with the upper surface of said separator adjacent its inner edge; inserting the top plate from the pile of positive plates into the holder until an edge thereof engages said movable member; inserting the top plate from the pile of separators, which are piled with their planar sides uppermost, into the holder and moving the movable member out of the path of the separator so that the latter is positioned in the holder with an edge thereof engaging the said one side member of the holder and with its planar side uppermost; causing the lower end of the movable member to move into engagement with the upper surface of the last-mentioned separator adjacent its inner edge; and repeating the steps of alternate insertion of plates and separators and movements of the movable member until a complete cell unit has been assembled with the plates laterally centered with respect to the separators.

5. A battery plate and separator assembling apparatus comprising a holder including a base and a pair of side members united together, the side members extending at substantially right angles to each other and to the base, the holder being adapted to receive and maintain battery plates and separators in stacked relationship, means for supporting said holder in an inclined position, means adapted to extend into said holder and to move parallel with respect to one of the side members thereof, the second-mentioned means having a surface extending inwardly with respect to the inner surface of said one side member and adapted to be engaged by the edge of each battery plate inserted in the holder for limiting the extent of insertion of the battery plates therein, and means to move the second-mentioned means out of the path of movement of the separators as they are inserted into the holder, whereby the separators may engage the said one side member of the holder so as to be offset with respect to the battery plates.

6. A battery plate and separator assembling apparatus comprising a holder including a base and a pair of side walls united together, the side walls extending at substantially right angles to each other and to the base, means for supporting said holder in an inclined position, one of said side walls having a longitudinally extending recess formed in the inner surface thereof, a bar slidably mounted in said recess with a surface thereof extending inwardly with respect to the inner surface of said one side wall and adapted to be engaged by the edge of each battery plate inserted in the holder, and means for reciprocating said bar within said recess to remove the said bar from the path of the separators as the latter are inserted into the holder so that the edges of the separators engage the inner surface of said one side wall.

7. A battery plate and separator assembling apparatus comprising a support, a holder for receiving the battery plates and separators removably mounted in an inclined position upon said support, the said holder including a side wall provided with longitudinally extending guide means on its inner surface, a bar slidably mounted in said guide means with a surface thereof extending inwardly with respect to the inner surface of said one side wall and adapted to be engaged by the edge of each battery plate inserted in the holder, and means for intermittently moving said bar relative to the side wall to remove the said bar from the path of the separators as the latter are inserted into the holder so that the edges of the separators engage the inner surface of said one side wall, the last-mentioned means including a treadle rockably mounted on said support and operatively associated with said bar.

8. A battery plate and separator assembling apparatus comprising a support, a holder for receiving the battery plates and separators removably mounted in an inclined position upon said support, the said holder including a side wall provided with longitudinally extending guide means on its inner surface, a bar slidably mounted in said guide means with a surface thereof extending inwardly with respect to the inner surface of said one side wall and adapted to be engaged by the edge of each battery plate inserted in the holder, and means for intermittently moving said bar relative to the side wall to remove the said bar from the path of the separators as the latter are inserted into the holder so that the edges of the separators engage the inner surface of said one side wall, the last-mentioned means including a treadle rockably mounted on said support, ratchet teeth upon said bar, and pawl means cooperating with said teeth and operatively connected with said treadle whereby rocking of the treadle in reverse directions reciprocates the bar relative to the side wall.

9. A battery plate and separator assembling apparatus comprising a support, a holder including a base and a pair of side walls united together, the side walls extending at substantially right angles to each other and to the base, the holder being adapted to receive and maintain the battery plates and separators in stacked relationship, means on said support for removably positioning said holder in an inclined position to facilitate the insertion of battery plates and separators therein, means adapted to extend into said holder and to move parallel with respect to one of the side walls thereof, the movable means having a surface thereof extending inwardly with respect to the inner surface of said one side wall and being adapted to be engaged by the edges of the battery plates when inserted in the holder to space the plates from the side wall of the holder, and treadle operated means to move the movable means out of the path of movement of the separators as they are inserted into the holder, whereby the separators may engage the said one side wall of the holder so as to be offset with respect to the battery plates.

10. A battery plate and separator assembling apparatus comprising a support, a holder including a base and a pair of side walls united together, the side walls extending at substantially right angles to each other and to the base, the holder being adapted to receive and maintain the battery plates and separators in stacked relationship, means on said support for removably positioning said holder in an inclined position to facilitate the insertion of battery plates and separators therein, means adapted to extend into said holder and to move parallel with respect to one of the side walls thereof and having a surface thereof extending inwardly with respect to the inner surface of said one side wall, and means for moving the said movable means in opposite directions to successively position it in the paths of the battery plates as the latter are inserted in the holder and to remove it from the paths of the separators as the latter are inserted in the holder, the last-mentioned means including a rockable member and means to convert the motion of the rockable member into straight-line motion of the movable means.

CHARLES A. YOUNG.

REFERENCES CITED

The following references are of record in the file of this patent:

UNITED STATES PATENTS

| Number | Name | Date |
| --- | --- | --- |
| 524,163 | Coleman | Aug. 7, 1894 |
| 550,844 | Ring | Dec. 3, 1895 |
| 1,702,987 | Wilson | Feb. 19, 1927 |
| 2,323,359 | Sillars | July 6, 1943 |
| 2,324,523 | Lund | July 20, 1943 |